United States Patent [19]
Keogh

[11] Patent Number: 5,104,920
[45] Date of Patent: Apr. 14, 1992

[54] FLAME RETARDANT COMPOSITIONS

[75] Inventor: Michael J. Keogh, Bridgewater, N.J.

[73] Assignee: Union Carbide Chemicals & Plastics Technology Corporation, Danbury, Conn.

[21] Appl. No.: 365,798

[22] Filed: Jun. 14, 1989

[51] Int. Cl.$^5$ ............................................... C08K 3/22
[52] U.S. Cl. ................................ 524/264; 174/110 R; 525/436; 525/437
[58] Field of Search .................. 524/264, 436, 437; 174/110

[56] References Cited

U.S. PATENT DOCUMENTS 3,979,356  9/1976  Walters ........................... 260/42.26
4,533,687  8/1985  Itoh et al. .
4,560,719  12/1985  Nakamura et al. ................ 524/436

Primary Examiner—Veronica P. Hoke
Attorney, Agent, or Firm—Saul R. Bresch

[57] ABSTRACT

A composition useful in the manufacture of cable comprising:
- (i) a crosslinkable thermoplastic resin;
- (ii) a metal hydrate flame retardant compound;
- (iii) an organic peroxide crosslinking compound, which decomposes at a temperature of at least about 140° C., but below the decomposition temperature of the polymer; and
- (iv) an unsaturated silicone fluid.

15 Claims, No Drawings

FLAME RETARDANT COMPOSITIONS

TECHNICAL FIELD

This invention relates to flame retardant compositions containing an ethylene copolymer and a magnesium hydroxide filler. The compositions are particularly useful in plenum cable.

BACKGROUND ART

Plenum cable is used to carry power through ducts which are used to ventilate, for example, high-rise buildings. While a fire occurring in these ducts can be dangerous in its own right, such a conflagration is especially insidious because the smoke and other gases resulting from the fire are transported through the ducts throughout the building, even to parts quite remote from the blaze. In some cases, colorless and odorless gases can invade sleeping quarters housing unsuspecting people.

The cable used in plenums is generally constructed of a metal conductor insulated with a polymeric material. These elements are generally twisted to form a core and are protected by another polymeric sheath or jacket material. In certain cases, added protection is afforded by inserting a wrap between the core and the sheath.

Thermoplastic non-halogen polymers containing a metal hydrate flame retardant such as magnesium hydroxide or aluminum hydroxide rely on an endothermic heat sink mechanism for flame resistance. Any interference with this mechanism can lead to a significant loss of effectiveness. Dripping, uneven combustion, loss of ash, and premature release of the hydrate are examples of interference, which lower flame resistance.

Methods are known to correct dripping and include (i) the addition of high surface area fillers to act as thixotropic agents and (ii) crosslinking to increase viscosity. However, added thixotropic agents increase extrusion problems and crosslinking adds a relatively expensive processing step.

DISCLOSURE OF INVENTION

An object of this invention, therefore, is to provide a composition, which comprises a thermoplastic polymer and a metal hydrate flame retardant, and, under combustion conditions, is capable of forming a substantial char and/or ash residue. This residue inhibits dripping and provides a thermal and gas barrier. A thermal barrier is useful provided that there is no continuous ignition source. It functions by preventing heat flux, i.e., the decomposition of the polymer into vapors, which provide fuel for the fire. The gas barrier functions by blocking oxygen from reaching the flame. These features are particularly advantageous in plenum cable in view of its exposure to duct fires.

Other objects and advantages will become apparent hereinafter.

According to the invention, a composition has been discovered, which meets the above objective. The composition comprises (i) a crosslinkable thermoplastic resin;
(ii) a metal hydrate flame retardant compound;
(iii) an organic peroxide crosslinking compound, which decomposes at a temperature of at least about 140° C., but below the decomposition temperature of the polymer; and
(iv) an unsaturated silicone fluid.

DETAILED DESCRIPTION

The thermoplastic resin can be any homopolymer or copolymer produced from two or more comonomers, or a blend of two or more of these polymers, conventionally used as jacketing and/or insulating materials in wire and cable applications. Generally, the monomers useful in the production of these homopolymers and copolymers will have 2 to 20 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene; other monomers such as styrene, p methyl styrene, alphamethyl styrene, p chloro styrene, vinyl naphthalene, and similar aryl olefins; nitriles such as acrylonitrile, methacrylonitrile, and alphachloroacrylonitrile; vinyl methyl ketone, vinyl methyl ether, vinylidene chloride, maleic anhydride, vinyl chloride, vinylidene chloride, tetrafluoroethylene, and chlorotrifluoroethylene; and acrylic acid, methacrylic acid, and other similar unsaturated acids.

The homopolymers and copolymers referred to can be non halogenated, or halogenated in a conventional manner, generally with chlorine or bromine. Examples of halogenated polymers are polyvinyl chloride, polyvinylidene chloride, and polytetrafluoroethylene. In addition to polyolefins, included among the polymers can be polyesters, polycarbonates, and polyurethanes. The homopolymers and copolymers of ethylene are preferred, both in the non-halogenated and halogenated form.

The metal hydrate flame retardant compound can be any of those used conventionally such as magnesium hydroxide and aluminum hydroxide. A particularly preferred magnesium hydroxide and a method for its preparation are described in U.S. Pat. No. 4,098,762 issued on July 4, 1978. Preferred characteristics for this magnesium hydroxide are (a) a strain in the <101> direction of no more than $3.0 \times 10^{-3}$; (b) a crystallite size in the <101> direction of more than 800 angstroms; and (c) a surface area, determined by the BET method, of less than 20 square meters per gram.

The amount of metal hydrate used in the composition is in the range of about 180 to about 350 parts by weight of metal hydrate per one hundred parts by weight of polymer and is preferably in the range of about 200 to about 320 parts by weight of metal hydrate per one hundred parts by weight of polymer.

The metal hydrate is preferably surface treated with a saturated or unsaturated carboxylic acid having about 8 to about 24 carbon atoms and preferably about 12 to about 18 carbon atoms or a metal salt thereof. Mixtures of these acids and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303.

The acid or salt can be merely added to the composition in like amounts rather than using the surface treatment procedure, but this is not preferred.

Component (iii) is an organic peroxide crosslinking compound, which decomposes at a temperature of at least about 140° C., but below the decomposition temperature of the polymer. Those having decomposition temperatures at or close to about 160° C. and no higher than about 200° C. are preferred.

The organic peroxide selected is one, which, under extrusion conditions and normal temperatures of use, will provide essentially no crosslinking, but will decompose at burning or conflagration temperatures to provide free radicals for crosslinking the thermoplastic polymer providing the wire and cable jacketing or insulation. An organic peroxide with at least a one hour half life decomposition temperature above about 130° C. can be used. A "half-life" of a peroxide at any specified temperature is the time required at that temperature can be used to effect a loss of one half of the active oxygen content of the peroxide. The half-life is considered to be a measure of decomposition of the organic peroxide. This minimum half life should insure that essentially no decomposition takes place before the onset of the fire.

Useful organic peroxides are peroxides having the formula ROOR', which decompose at temperatures of less than about 160° C., and hydroperoxides having the formula ROOH, which decompose in the 160° to 200° C. range. The former are more efficient crosslinkers; however, the latter are preferred because of their higher decomposition temperatures. Specific organic peroxides are t-butylcumylperoxide; di-tert-butylperoxide; 2,5 dimethyl-2,5 di(t butylperoxide)(hexyne-3); cumene hydroperoxide; t-butyl hydroperoxide; t-amyl hydroperoxide; and 2,5-dihydro-peroxy-2,5-dimethylhexene.

The amount of organic peroxide, which will provide sufficient crosslinking at conflagration temperatures is in the range of about 0.1 to about 5 parts by weight of organic peroxide per one hundred parts by weight of polymer. A preferred amount of organic peroxide is in the range of about 0.5 to about 2 parts by weight of organic peroxide for each one hundred parts by weight of polymer.

Component (iv) is an unsaturated silicone fluid. It is believed to function as a co-crosslinking agent, i.e., it cooperates with the organic peroxide in the formation of a crosslinked polymer, at least part of which, under combustion conditions, becomes a siliceous char and/or ash. This material inhibits dripping in the balance of the resin and acts as a thermal and gas barrier as described above. Silicone fluids are organosiloxane polymers commercially available in a range of viscosities from 0.65 to about 1,000,000 centistokes. Viscosities in the range of about 1000 to about 1,000,000 centistokes are useful in subject composition and those in the range of about 10,000 to about 1,000,000 centistokes are preferred. As noted, the silicone fluids selected are those which are unsaturated, particularly those silicone fluids having one or more ethylenically unsaturated groups. Vinyl substituted silicone fluids are of particular interest. The silicone fluid can contain about 1 to about 10 percent by weight ethylenically unsaturated groups and preferably contains about 2.5 to about 7 percent by weight ethylenically unsaturated groups.

One embodiment of a vinyl substituted silicone fluid can be represented by the following formula:

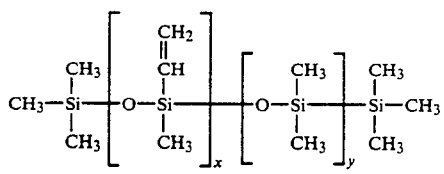

wherein x plus y can be equal to 1 to 5000 and can be alike or different. The silicone fluids are preferably characterized by their viscosity, however.

The amount of vinyl substituted silicone fluid which can be used in subject composition is in the range of about 0.1 to about 10 parts by weight per one hundred parts by weight of polymer and is preferably in the range of about 1 to about 5 parts by weight per one hundred parts by weight of polymer.

Other useful additives for subject composition are coupling agents, surfactants, reinforcing filler or polymer additives, antioxidants, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants. Some of the more important additives are discussed below.

A coupling agent is a chemical compound, which chemically binds polymer components to inorganic components. This is effected by a chemical reaction taking place at the temperatures under which the formulation is compounded, about 70° C. to about 180° C. The coupling agent generally contains an organofunctional ligand at one end of its structure which interacts with the backbone of the polymeric component and a ligand at the other end of the structure of the coupling compound which attaches through reaction with the surface hydrolytic species of the filler. The following silane coupling agents are useful in subject composition: gamma-methacryloxypropyltrimethoxy silane; methyltriethoxy silane; methyltris (2-methoxyethoxy) silane; dimethyldiethoxy silane; vinyltris(2- methoxyethoxy) silane; vinyltrimethoxy silane; and vinyltriethoxy silane; and mixtures of the foregoing. A preferred silane coupling agent is a mixture of gamma-methacryloxypropyl-trimethoxy silane and vinyltriethoxysilane. This mixture is described in U.S. Pat. No. 4,481,322.

The coupling agent can be used in amounts of about 0.05 part by weight to about 0.5 part by weight for each 100 parts of copolymer. The effect can be maximized by the inclusion of suitable surfactants and free radical generators.

Examples of antioxidants are: hindered phenols such as tetrakis[methylene(3,5 di tert-butyl-4-hydroxyhydrocinnamate)]methane and thiodiethylene bis(3,5-di tert butyl 4-hydroxy)hydrocinnamate; phosphites and phosphonites such as tris(2,4 di-tert-butylphenyl)-phosphite and di-tert-butylphenylphosphonite; various amines such as polymerized 2,2,4-trimethyl- 1,2 -dihydroquinoline; and silica. A tetrakis methane compound is preferred. Antioxidants are used in amounts of about 1 to about 5 parts by weight per hundred parts by weight of copolymer.

In addition to being useful in wire and cable applications, particularly plenum cable applications, subject composition can be used as a sheath for a glass core in fiber optics applications.

The patents mentioned in this specification are incorporated by reference herein.

The invention is illustrated by the following example.

EXAMPLE

The following components are used in this example. Parts are by weight.

1. 100 parts of an ethylene/vinyl acetate copolymer containing 28 percent by weight vinyl acetate and having a melt index of 3.0.
2. 200 parts of surface treated magnesium hydroxide.
3. 2 parts of tetrakis [methylene(3,5-di-tert-butyl 4-hydroxyhydrocinnamate)] methane.
4. 1 part of dicumyl peroxide.
5. 2.5 parts of vinyl substituted silicone fluid, the structural formula of which is set forth above. The viscosity of the silicone fluid is 250,000 centistokes.

In a Brabender mixer, the above components are blended to form a homogeneous mixture at a temperature of 130° C., and the mixture is discharged. This procedure is repeated except that the vinyl substituted silicone fluid is omitted. The two compositions are processed into test specimens as required by the test procedure for Limiting Oxygen Index (LOI), i.e., ASTM-D 2863-70, and the test procedure is carried out. See, also, U.S. Pat. No. 4,446,279 issued May 1, 1984. Limiting Oxygen Index measures and quantifies flame resistance. The higher the LOI number the greater the flame resistance or flame retardance and the lower the emissions of smoke and other harmful gases. It is found that the composition containing the vinyl substituted silicone fluid has a higher LOI.

What is claimed is:

1. A cable comprising a metal core conductor having a electrical current running therethrough and at least one uncrosslinked layer surrounding the core consisting essentially of:
   (i) a crosslinkable thermoplastic resin;
   (ii) a metal hydrate flame retardant compound;
   (iii) an essentially unreacted organic peroxide crosslinking compound, which decomposes at a temperature of at least about 140° C., but below the decomposition temperature of said resin; and
   (iv) an unsaturated silicone fluid.

2. The cable defined in claim 1 wherein the metal hydrate is present in an amount of about 180 to about 350 parts by weight of metal hydrate; the organic peroxide is present in an amount of about 0.1 to about 5 parts by weight of organic peroxide; and silicone fluid is present in an amount of about 0.1 to about 10 parts by weight of silicone fluid, all per 100 parts by weight of said resin.

3. The cable defined in claim 1 wherein the organic peroxide has at least a one hour half-life decomposition temperature above about 130° C.

4. The cable defined in claim 1 wherein said resin is a homopolymer of ethylene or a copolymer derived from a major proportion of ethylene and one or more higher alpha olefins.

5. The cable defined in claim 1 wherein said resin is a copolymer comprising a major proportion of ethylene and one or more unsaturated esters.

6. The cable defined in claim 1 wherein the resin is non-halogenated.

7. The cable defined in claim 1 additionally containing up to about 5 parts by weight based on 100 parts by weight of the metal hydrate of a carboxylic acid having 8 to 24 carbon atoms or a metal salt thereof.

8. The cable defined in claim 7 wherein the metal hydrate is surface treated with the carboxylic acid or metal salt.

9. The cable defined in claim 1 wherein the metal hydrate is present in an amount of about 200 to about 320 parts by weight based on 100 parts by weight of the polymer.

10. The cable defined in claim 1 wherein the metal hydrate is magnesium hydroxide.

11. The cable defined in claim 4 wherein the organic peroxide has at least a one hour half life decomposition temperature above about 130° C.

12. The cable defined in claim 1 wherein the organic peroxide is an organic hydroperoxide.

13. The cable defined in claim 18 wherein the silicone fluid has a viscosity of about 0.65 to about 1,000,000 centistokes.

14. The cable defined in claim 2 wherein the silicone fluid has a viscosity of about 10,000 to about 1,000,000 centistokes.

15. The cable defined in claim 14 wherein the silicone fluid contains ethylenically unsaturated groups in an amount of about 1 to about 10 percent by weight based on the weight of the silicone fluid.

* * * * *